United States Patent [19]
Liu et al.

[11] Patent Number: 5,361,320
[45] Date of Patent: Nov. 1, 1994

[54] LIQUID CRYSTAL FIBER WAVEGUIDE

[75] Inventors: Jian-Yu Liu; Kristina M. Johnson, both of Boulder, Colo.

[73] Assignee: University of Colorado Foundation, Boulder, Colo.

[21] Appl. No.: 19,856

[22] Filed: Feb. 19, 1993

[51] Int. Cl.$^5$ .............................................. G02B 6/00
[52] U.S. Cl. .................................. 385/143; 385/125; 385/2; 385/142
[58] Field of Search ................ 385/1, 2, 122, 27, 123, 385/125, 141, 142, 143; 356/352; 359/36, 87, 39, 42, 54, 55, 56, 84

[56] References Cited

U.S. PATENT DOCUMENTS

| 4,792,208 | 12/1988 | Ulman et al. | 385/122 |
| 4,859,017 | 8/1989 | Brierley et al. | 385/27 |
| 4,861,136 | 8/1989 | Stone et al. | 385/27 |
| 5,138,010 | 8/1992 | Keller et al. | 528/26 |

FOREIGN PATENT DOCUMENTS

| 0258898 | 9/1987 | European Pat. Off. | C09K 19/38 |
| 0296571 | 6/1988 | European Pat. Off. | G02F 1/133 |
| 63-17410 | 1/1988 | Japan . | |
| 63-26639 | 2/1988 | Japan . | |
| 63-204235 | 8/1988 | Japan . | |

OTHER PUBLICATIONS

Uchida et al., "Synthesis of Some Smectic Liquid Crystalline Polymers and Their Ferroelectricity", Mol. Cryst. Liq. Cryst., 1988, vol. 155, pp. 93–102.
H. Finkelmann and H. J. Kock, "Liquid Crystal Side Chain Polymers: Properties and Aspects for Applications", Display Technology, 1985, vol. I, pp. 81–94.
R. A. Bergh et al., "Single-mode fiber-optic polarizer", Optics Letters, vol. 5, No. 11, pp. 479–481 (Nov. 1980).
M. Kuzma and M. M. Labes, "Liquid Crystals in Cylindrical Pores: Effects on Transition Temperatures and Singularities", Mol. Cryst. Liq. Cryst., vol. 100, pp. 103–110 (1983).
E. S. Goldburt and P. St.J. Russell, "Nonlinear single-mode fiber coupler using liquid crystals", Appl. Phys. Lett. 46(4) pp. 338–340 (1985).
R. B. Dyott et al., "Indium-coated D-shaped-fiber polarizer", Optics Letters, vol. 12, No. 4, pp. 287–289 (1987).
S. K. Lo, et al., "Nonlinear Waveguides with Liquid Crystalline Cores", IEEE Catalog Number 90CH2905-8 (1990).
G. P. Crawford et al., "Ordering and Self-Diffusion in the First Molecular layer at a Liquid-Crystal-Polymer Interface", Phys. Review Letters, vol. 66/6, pp. 723–726 (1991).
Jos. T. Mang et al., "Smectic Layer Orientation in Confined Geometries", Mol. Cryst. Liq. Cryst., vol. 223, pp. 133–142 (1992).
D. Bosc and C. Toinen, "Full Polymer Single-Mode Optical Fiber", IEEE Photonics Tech. Lett., vol. 4/7, pp. 749–750 (1992).

Primary Examiner—Rodney B. Bovernick
Assistant Examiner—John Ngo
Attorney, Agent, or Firm—Greenlee and Winner

[57] ABSTRACT

This invention provides a fiber waveguide with a liquid crystal core. The liquid crystals are aligned in layers with molecular directors approximately parallel to each other. An electric field can be applied to the liquid crystal core to provide linear and nonlinear optical modulation. Alone or in combination with polarizers, reflectors, and birefringent elements, the waveguide of this invention provides phase, polarization and intensity modulation, spectral filtering, and second harmonic generation.

34 Claims, 4 Drawing Sheets

LIQUID CRYSTAL FIBER WAVEGUIDE

This invention was made with Government support under contract GER902421 awarded by the National Science Foundation. The Government has certain rights to this invention.

FIELD OF THE INVENTION

This invention pertains to optical fiber waveguides with liquid crystal cores and to devices utilizing these waveguides.

BACKGROUND OF THE INVENTION

Liquid crystal electrooptic modulation has been utilized in a number of device applications. Nematic liquid crystals provide analog retardation changes due to rotation of birefringent molecules out of the plane of the incident optical field with tuning speeds of 1–100 ms. Chiral smectic liquid crystals (CSLCs) provide tuning speeds of 1 μs. When incorporated in a "bookshelf" geometry cell (smectic layers oriented perpendicular to the substrate walls), analog CSLC materials, such as SmA* and distorted helix ferroelectrics (DHF), display an analog tilt of the cell optical axis in the plane of the cell walls upon application of an electric field across the smectic layers. In a discrete, multi-state cell, for example using ferroelectric SmC* or SmH* or antiferroelectric phases, application of an electric field above a certain threshold voltage results in switching of the tilt of the CSLC molecules between discrete stable states. In homeotropically aligned cells (smectic layers parallel to substrate walls), the optical axis of the CSLC material rotates in a plane perpendicular to the cell walls on application of an electric field across the smectic layers by electrodes that are lateral to the substrate walls.

Smectic liquid crystal cells have been employed in a wide range of device applications. Linear optical effect devices function by reorientation of the molecular director, a vector on the long axis of the molecule. Discrete and continuously tunable single and multiple stage color filters employing ferroelectric and chiral smectic liquid crystals are described by Johnson et al., U.S. Pat. No. 5,132,826. Intensity modulation is achieved by placing a smectic liquid crystal cell between polarizers (Lagerwall et al., U.S. Pat. No. 4,838,663). Phase, intensity and wavelength modulation by chiral smectic liquid crystal cells within Fabry-Perot cavities are described by Sharp et al. in U.S. patent application Ser. No. 07/792,284 filed Nov. 14, 1991.

In addition to the linear optical effects described above, second-order nonlinear optical effects in chiral smectic liquid crystals have been demonstrated, Chiral smectic liquid crystals display both second harmonic generation (Liu et al., Opt. Lett. 15, 267 (1990)) and the linear electrooptic effect (Liu et al., U.S. patent application Ser. No. 07/938,997 filed Sep. 2, 1992. However, the conversion efficiency for second-order nonlinear optical effects in liquid crystals is low and so a long interaction length is required.

In the rapidly growing field of optical fiber communications, devices such as phase and polarization controllers, amplitude switches, and multiplexer-demultiplexers are essential. Switch arrays, tunable filters, and high-speed modulators have been demonstrated using guided-wave devices fabricated with inorganic materials such as lithium niobate (Alferness, Science 234, 825 (1986)) and with organic polymers. Fiber optic polarizers have also been demonstrated (Bergh et al., Opt. Lett. 5, 479 (1980) and Dyott et al., Opt. Lett. 12, 287 (1987)).

Liquid crystals have been incorporated in devices used with optical fibers. Nematic liquid crystals provide coupling between guided light in two single mode fibers when a section of the fiber walls is ground down to the vicinity of the fiber core and a layer of nematic liquid crystal is placed between them (Goldburt et al., Appl. Phys. Lett. 46, 338 (1985)). Tunable wavelength nematic liquid crystal Fabry-Perot filters (Patel, U.S. Pat. No. 5,150,236) can be employed between fibers for wavelength demultiplexing. Liquid crystal Fabry-Perot filters have been mounted in a guided sleeve between two optical fibers (Hirabayashi et al., Jpn. J. Appl. Phys. 31, L1355 (1992)).

Waveguides have been fabricated with organic cores. A fiber was constructed with a polymethyl-methacrylate (PMMA) polymer core (Bosc et al., IEEE Photonics Tech. Lett. 4, 749 (1992)). Waveguide structures have been fabricated with a homeotropically aligned smectic liquid crystal core in which the molecular directors are perpendicular to the wall of the guided structure (Lo et al. Nonlinear Optics: Materials, Phenomena and Devices Digest, 37, IEEE Cat. No. 90CH2905-8 (1990)).

SUMMARY OF THE INVENTION

This invention is a fiber waveguide with a liquid crystal fiber core. The liquid crystals are aligned with molecular directors approximately parallel to each other. The molecular directors can be aligned parallel to the fiber axis. Alternatively, the molecular directors can be in a plane orthogonal to the fiber axis. They can also be tilted between these two cases. The smectic liquid crystals of the invention can be SmA*, SmC*, DHF, or other liquid crystal materials.

In this invention an electric field with a component in a direction orthogonal to the fiber axis can be applied to the waveguide core. In the embodiment with means for applying an electric field, this invention includes fiber waveguides with liquid crystal cores of any alignment, including both nematic and smectic liquid crystals. The fiber waveguide of this invention can modulate the phase, polarization, or both phase and polarization of elliptically polarized light guided through the fiber. This invention includes the fiber waveguide in combination with polarizers, optical cavities, and birefringent elements to provide, among other functions, amplitude modulation and spectral filtering.

The electric field of this invention can be applied with electrodes detached from the fiber or with electrodes deposited on or in the fiber. The cladding layer thickness can be reduced to decrease the voltage required to produce a switching field. The fiber can have one or more flat outer surfaces on the cladding layer, for example it can be a D-shaped fiber, with pairs of electrodes deposited on a flat surface to produce the electric field in the fiber core. In this invention, multiple sets of electrodes can be employed on one fiber to provide a sequence of active regions. Polarizers can be fabricated in the fiber, for example by placing a conducting material within the evanescent field of the waveguide.

This invention also provides nonlinear optical processes within the liquid crystal core. The fiber waveguide can be used for second harmonic generation, for which the length of the waveguide is advantageous.

The linear electrooptic (Pockels) effect can be used with the waveguides of this invention for very high speed optical modulation.

DETAILED DESCRIPTION OF THE PREFERRED EMBODIMENTS

Figure 1A:
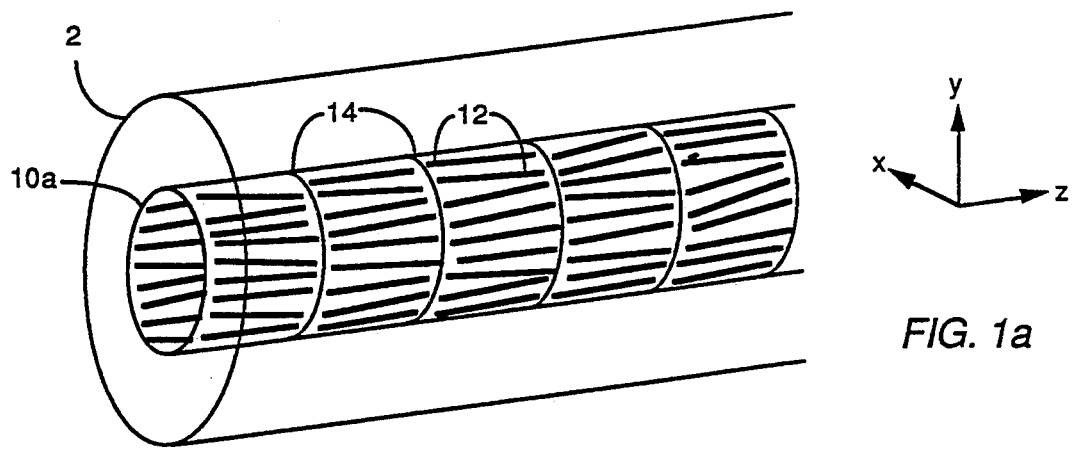
FIG. 1a is a fiber waveguide with a smectic liquid crystal core with the molecular directors aligned parallel to the fiber axis.

Referring now to the drawings, like numbers indicate like features and the same number appearing in more than one drawing refers to the same element.

Figure 1B:
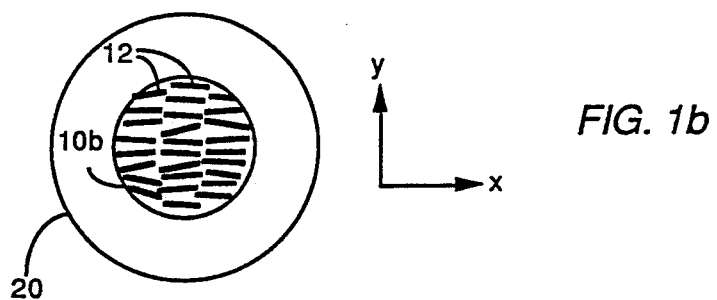
FIG. 1b is a cross-section of a fiber waveguide with a smectic liquid crystal core with the molecular directors in a plane orthogonal to the fiber axis.

This invention is a fiber waveguide with a liquid crystal core. In preponderance, the liquid crystals are aligned with molecular directors parallel to each other. They can be parallel to the fiber axis, as illustrated in FIG. 1a. The fiber core 10a comprises liquid crystal molecules 12 in smectic layers 14. The fiber cladding layer 20 is made of a material with a refractive index lower than that of the core. The fiber axis is in the z direction. In the embodiment illustrated in FIG. 1a, the liquid crystal molecules are aligned approximately parallel to the fiber axis and the smectic layers are normal to the fiber axis. The smectic layers can also be tilted. FIG. 1b illustrates a second liquid crystal alignment. In this case the molecules are parallel to each other and lie in a plane orthogonal to the fiber axis. In this illustration, the fiber axis is in the z direction. Fiber core 10b comprises liquid crystal molecules 12 oriented in the x direction. The smectic layers are in the y direction. The cladding layer and core shapes are cylindrical in these illustrations but may be other shapes as well. The core diameter and the refractive indices of the core and cladding layer can be chosen to propagate a single waveguide mode or multiple modes.

Figure 2:
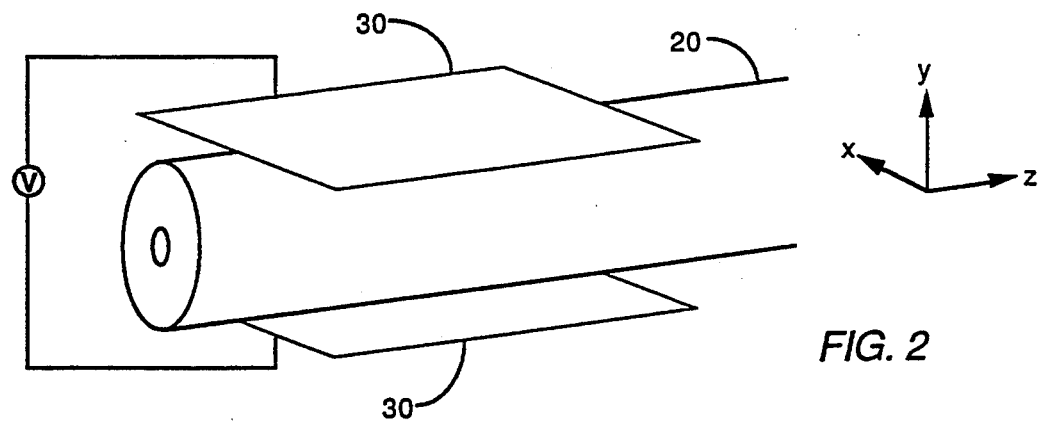
FIG. 2 is a liquid crystal fiber waveguide device with electrodes to apply a field to the fiber core.

In the waveguide of this invention, an electric field can be applied to the liquid crystal core to produce linear and nonlinear optical modulation. In the embodiment of FIG. 2, voltage is applied to electrodes 30 to produce an electric field in the y direction. In response to this field, molecules with molecular directors along the z axis (FIG. 1a), parallel to the fiber axis, rotate in the x-z plane. Molecules oriented along the x axis (FIG. 1b) also rotate in the x-z plane. For a molecule with a molecular director in the y direction, a field in the y direction would not induce rotation of the molecule. In the alignment of FIG. 1a the core has $C_2$ symmetry and so the x and y directions are equivalent. In the aligmnment of FIG. 1B, the applied electric field must have a component orthogonal to the molecular directors (y direction).

Exemplary liquid crystal fiber waveguides of this invention were prepared as follows. Optical silicate fiber with 125 $\mu$m cladding outer diameter and 10 $\mu$m hollow core diameter was heated to 150° C. in high vacuum. Within the vacuum chamber, the fiber tip was placed in contact with liquid crystal BDH 764E (British Drug House) for 30 min and the liquid crystal was drawn into the fiber by capillary action. The length of fiber with a liquid crystal core was greater than 3 cm. The fiber was then cooled to room temperature in vacuum over the course of 3-4 hours to produce the SmA* phase. In this example neither an alignment layer nor an alignment field was employed to produce the alignment of FIG. 1a. The alignment of FIG. 1b can be achieved by using an electric or magnetic field to align the molecules during fabrication. In this embodiment the liquid crystal is in the SmA* phase. Liquid crystal material which aligns with molecular directors parallel to each other can be used, including liquid crystals in the SmC* phase. In DHF material the molecular directors point along a helix and are not all parallel to each other. However, within each smectic layer the directors are parallel to each other.

The alignment of the liquid crystals within the fiber was demonstrated by the observation of opto-electronic switching. The fiber was sandwiched between two transparent electrodes, as in FIG. 2, and between crossed polarizers. A 5 V/$\mu$m electric field was applied across the fiber in the y direction and transmission in the y direction through the polarizers was monitored. Switching the electric field switched the intensity of light transmitted. This indicates modulation of the x–z components of the index of refraction, consistent with the alignments shown in FIG. 1. Rotation of the liquid crystal molecules rotates the entire index ellipsoid which affects the waveguide propagation characteristics as well. Note that in this demonstration the light propagated in the y direction through the fiber walls as opposed to in the z direction along the fiber axis.

This ability to switch the average orientation of the molecular directors and thus of the index ellipsoid of the liquid crystal permits the use of the liquid crystal waveguide of this invention in many applications. For light propagating within the liquid crystal core along the fiber axis, i.e. in the z direction, tilting of the liquid crystal molecules in the x-z plane by application of a field in the y direction results in modulation of the magnitude of the index ellipsoid in the x direction. Thus the liquid crystal fiber is a variable-amplitude retarder. This is contrasted with bookshelf aligned planar liquid crystal cells wherein the molecules are aligned parallel to the substrates and application of an electric field tilts the molecules in a plane parallel to the substrates. For light propagating through the substrates, the tilting is therefore orthogonal to the direction of propagation of light and thus the cell is a rotatable retarder rather than a retarder with variable amplitude of retardation. In the case of bookshelf aligned planar cells, variable-amplitude retardation can only be achieved by utilizing additional birefringent elements.

The liquid crystal fiber waveguide of this invention has several other advantages over planar liquid crystal cells. In order to maintain bookshelf alignment, the liquid crystal layer thickness in planar cells is limited to tens of microns. In contrast, liquid crystal fiber waveguides can be meters or perhaps kilometers long. This provides orders of magnitude increased interaction length with the liquid crystal. In planar cells, the light propagates through substrates, semi-transparent electrodes, and sometimes alignment layers as well, with resultant transmission losses. In this invention absorption losses are minimized because the electrodes and cladding layer are not in the beam path. Multiple stages of controllable retardation can be achieved with a single fiber. Electrodes 30 in FIG. 2 can be a series of independently controlled electrodes.

Figure 3A:
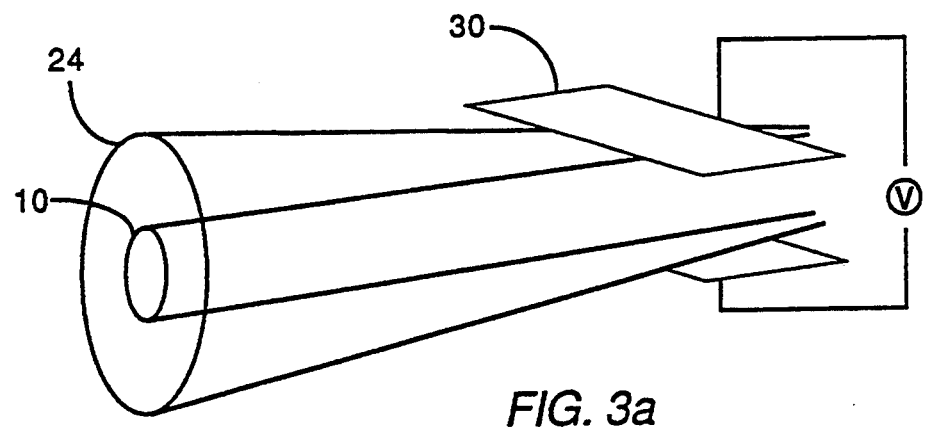
FIGS. 3 shows liquid crystal/fiber waveguide devices with a tapered cladding layer (FIG. 3a), electrodes embedded in the cladding layer (FIG. 3b), and a D-shaped cladding layer (FIG. 3c).
Figure 3B:
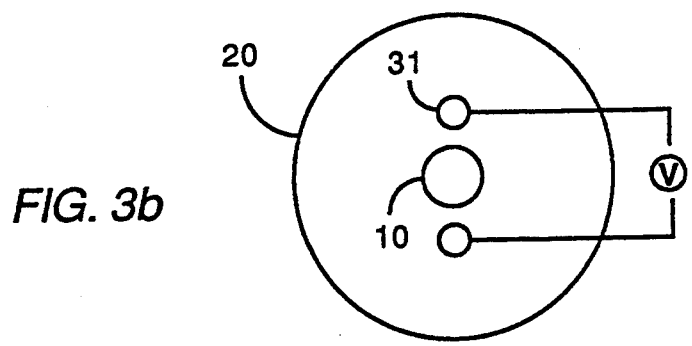
Figure 3C:
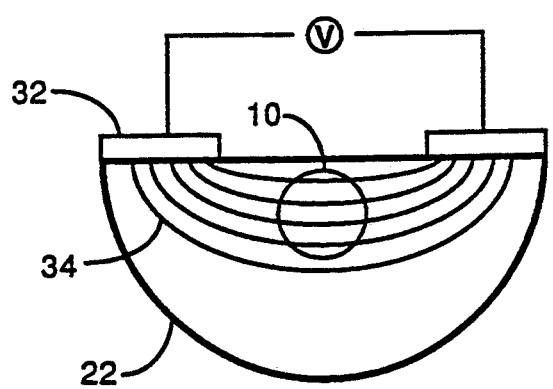

Modifications of the embodiment shown in FIG. 2 permit the use of lower voltages to achieve the required electric field (typically $\leq 15$ V/$\mu$m) for switching the liquid crystals. In FIG. 3a, the fiber cladding layer 24 is tapered, for example by etching or polishing, to decrease the distance between electrodes 30 and thus reduce the required voltage. Embedding electrodes 31 within cladding layer 20 brings them closer to core 10, as shown in FIG. 3b. In FIG. 3c a D-shaped fiber is employed. The D-shaped fiber has cladding layer 22 and liquid crystal core 10. The thickness of the cladding layer is reduced on the flat side of the fiber permitting closer access to the liquid crystal core. Electrodes 32 are located on the flat side of the fiber. Application of a voltage to the electrodes produces an electric field in the fiber illustrated with field lines 34. Within the liquid crystal core the electric field is approximately uniform. In this embodiment the electrodes can be directly deposited on the fiber to provide a compact and flexible switching device. Electrodes can also be deposited on opposite sides of a cylindrically shaped fiber.

Figure 4A:
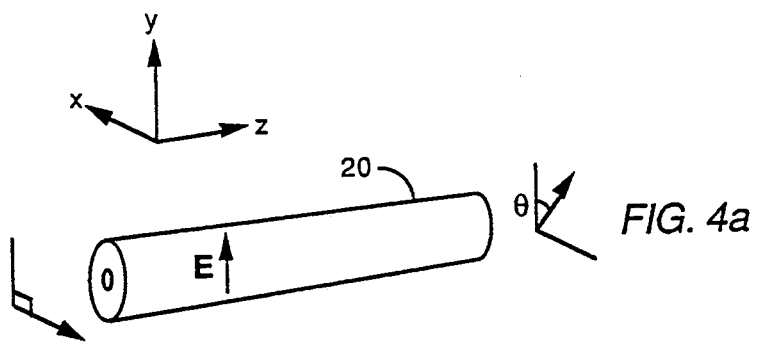
FIG. 4 shows liquid crystal fiber waveguide devices with an applied electric field (FIG. 4a) and with additional polarizers (FIG. 4b), reflectors (FIG. 4c), or birefringent elements (FIG. 4d).

Applications of this fiber waveguide include TE-TM mode conversion, intensity modulation, phase modulation, polarization control, second harmonic generation, and tunable filtering. FIG. 4a illustrates the polarization controller of this invention. Fiber cladding 20 contains a liquid crystal core, and means are provided to apply an electric field or a sequence of electric fields across the fiber. The arrows at either side of the fiber in FIG. 4a represent the polarization of light incident on and transmitted by the fiber. The polarizations are in the x-y plane. With application of appropriate electric fields, the waveguide rotates the polarization by angle $\theta$. When $\theta = 90°$ the waveguide is a TE-TM converter. The input and output light can each be linearly or elliptically polarized. With multiple pairs of electrodes, the phase and polarization of the transmitted light can be independently controlled.

The addition of polarizers 40 and 45 (FIG. 4b), or linearly polarized input light and exit polarizer 45, to the polarization controller creates an intensity modulator of monochromatic light. The output intensity is determined by the rotation of the polarization and by the angle between polarizers 40 and 45. For polychromatic light, the device of FIG. 4b is a color filter because wavelengths with polarization rotated to the angle of exit polarizer 45 are transmitted in preference to other wavelengths.

When the fiber waveguide is placed within a Fabry-Perot cavity formed by mirrors 50 and 55 (FIG. 4c), light transmission is dependent on the cavity resonance conditions. For monochromatic light, the Fabry-Perot device is an amplitude or phase modulator. For polychromatic light, it is a spectral filter.

Figure 4B:
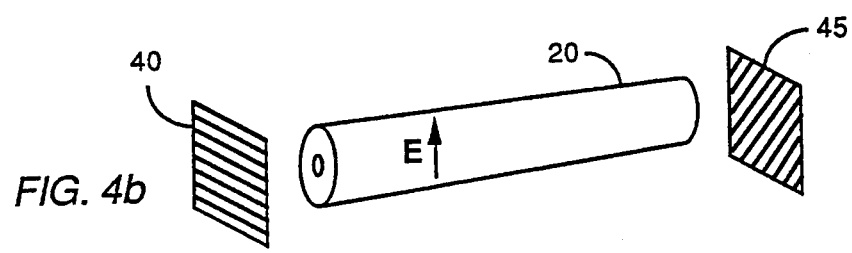
Figure 4C:
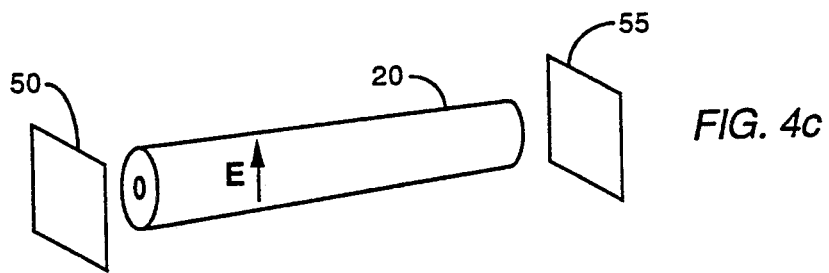
Figure 4D:
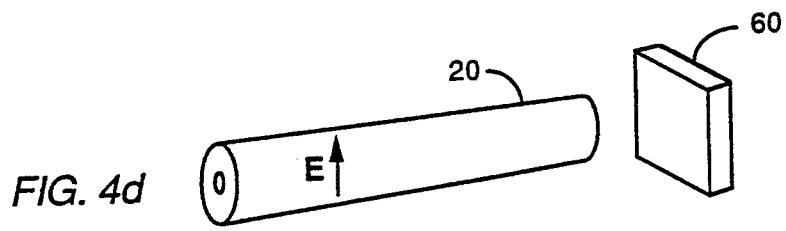

The tunable waveguide of this device can also be used in combination with a fixed birefringent element 60, as illustrated in FIG. 4d. Additional birefringent elements can also be employed within and outside of the polarizer stage of FIG. 4b and the optical cavity of FIG. 4c.

Figure 5A:
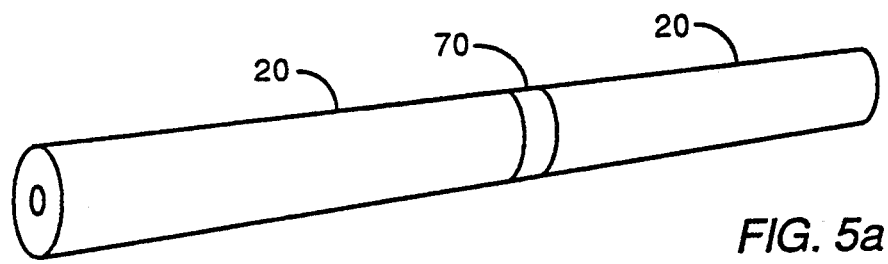
FIG. 5a is a liquid crystal fiber waveguide with an additional optical element within the waveguide.

The elements shown in FIG. 4b-d can be incorporated directly into the waveguide. FIG. 5a illustrates a fiber waveguide with optical element 70 incorporated in the waveguide. Element 70 can be, for example, a polarizer, reflector, waveplate, birefringent element, Faraday rotator, holographic in-fiber grating, or laminated metal-dielectric layer. It can be fabricated directly in the fiber core or connected on by splicing, for example. The liquid crystal core fiber can be spliced with other optical fibers. For example, it can be used in combination with erbium or yttrium doped silicate fibers, germanosilicate fibers, and photosensitive fibers.

The liquid crystal fiber waveguide of the invention is especially advantageous in applications which require cascading a series of active liquid crystal retarders to modulate light. With the conventional planar liquid crystal cells, thick substrates (typically > 1 mm), such as optical flats, are required to hold the liquid crystals. This results in a bulky system that supports only a few microns of active materials. The liquid crystal fiber waveguide of this invention solves this problem. By properly patterning the electrodes along the liquid crystal fiber waveguide, bulky optical systems can be shrunk to a small chip. Integration with components becomes feasible, and expensive fiber pigtailing is not necessary. A polorization-insensitive retarder can be constructed with the fiber waveguide of FIG. 1a. By applying a field in the y direction in one section of fiber and in the x direction in another section, the TE and TM components are both retarded.

Figure 5B:
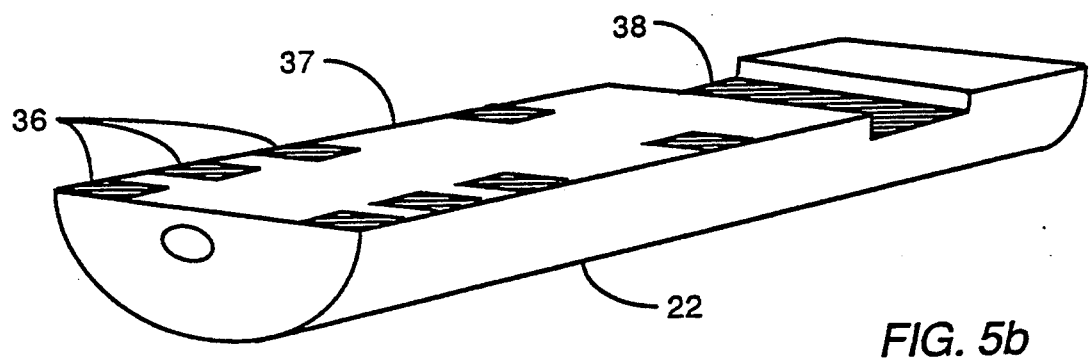
FIG. 5b is a liquid crystal fiber waveguide with multiple active regions.

FIG. 5b illustrates the integration of several components in a single fiber. This embodiment utilizes a D-shaped cladding layer 22 with a liquid crystal core and patterned electrodes. Electrodes 36 can be independently biased to create a series of active regions. A fixed birefringent element is provided by unbiased region 37. Even a polarization stage 38 can be incorporated within the fiber. By removing a portion of the cladding layer and adding a conducting coating, the component of the polarization perpendicular to the flat surface of the D-shaped fiber is coupled out of the fiber via the evanescent fields while the other polarization continues to propagate. Among the devices which can be constructed with a combination of active and fixed birefringent elements and polarizers is a tunable Lyot-type filter. A Bragg diffraction structure can be fabricated with periodic or aperiodic interdigital electrodes.

The liquid crystal fiber waveguide of this invention is particularly advantageous for nonlinear optics applications. Optical second-order nonlinear ($X^2$) effects include second harmonic generation and the linear electrooptic (Pockels) effect. In liquid crystals these effects are limited by low values of the nonlinear susceptibility and of the linear electrooptic coefficients, respectively. Note that the so-called linear electrooptic effect is in fact a second order nonlinear effect, as distinct from the linear optical effects involving molecular reorientation described above. Because liquid crystal fiber waveguides can provide active regions with thickness on the order of meters or even kilometers rather than microns, the low efficiency of nonlinear optical effects can be overcome.

The material requirements for displaying nonlinear optical effects are macroscopic order and non-centrosymmetric structure. The smectic liquid crystal waveguides of this invention provide macroscopic order. In the SmC* and DHF phases liquid crystals have non-centrosymmetric structure. Application of a bias field to SmA* liquid crystals breaks the centro-symmetry of this structure and makes them also active for nonlinear optical effects. The alignment of liquid crystal molecules approximately parallel to the fiber walls is particularly suitable for nonlinear optical effect devices because for most liquid crystals the $d_{22}$ component of the nonlinear susceptibility and the $r_{22}$ linear electrooptic coefficient are the largest. Thus, alignment of the molecular director along the z axis provides optimum coupling with electric fields in the y direction. Other alignments are also suitable for nonlinear optical applications of the waveguides of this invention.

Embodiments of the second harmonic generator of this invention include the liquid crystal fiber waveguide of FIG. 1 with a non-centrosymmetric liquid crystal core and the biased waveguide of FIG. 2 wherein the bias creates a non-centrosymmetric material. In either case, the switching characteristic of the liquid crystals can also be applied to the frequency doubling whereby the second harmonic generation can be modulated by molecular reorientation.

An embodiment of the linear electrooptic effect device of this invention is the liquid crystal fiber waveguide of FIG. 2 with a liquid crystal core which is either non-centrosymmetric at zero bias or is made non-centrosymmetric with an applied bias. Impedance matching of the electrodes enables high speed modulation of the index of refraction of the liquid crystal core. As in the case of linear optical devices described above, the linear electrooptical effect devices of this invention can be used alone or in combination with polarizers and mirrors to produce phase, polarization and amplitude modulation and spectral filtering.

This invention provides a liquid crystal fiber waveguide and devices utilizing this waveguide in combination with means for applying electric fields and with optical elements including polarizers, mirrors, and birefringent elements. This invention is not limited to the specific materials, dimensions, configurations, and combinations provided herein for illustration. Numerous other embodiments within the range and scope of this invention will be readily apparent to those skilled in the art.

We claim:

1. A smectic liquid crystal fiber waveguide comprising:
   an optical fiber cladding characterized by a fiber axis layer; and
   a nonpolymeric smectic liquid crystal core within said cladding layer;
   said liquid crystal oriented with the molecular directors within a smectic layer of said liquid crystal approximately parallel to each other.

2. The fiber waveguide of claim 1 wherein said molecular directors are approximately parallel to said fiber axis.

3. The fiber waveguide of claim 1 wherein said molecular directors are at an angle to said fiber axis.

4. The fiber waveguide of claim 1 wherein each of said molecular directors is in a plane approximately orthogonal to said fiber axis and wherein said smectic layers are approximately planar.

5. The fiber waveguide of claim 1 wherein said molecular directors are approximately parallel to said fiber axis.

6. The fiber waveguide of claim 1 wherein said fiber cladding layer is a glass fiber cladding layer.

7. The fiber waveguide of claim 6 wherein the diameter of said liquid crystal core is on the order of ten microns.

8. A liquid crystal fiber waveguide comprising:
   an optical fiber cladding layer;
   a liquid crystal core within said cladding layer; and
   means for altering the orientation of the molecular directors of said liquid crystal including variable electric field means for applying a plurality of electric fields to said liquid crystal and switching means for switching from a first electric field to a second electric field.

9. The fiber waveguide of claim 8 wherein said electric field means comprises two electrodes.

10. The fiber waveguide of claim 9 wherein said two electrodes are planar electrodes oriented parallel to each other and positioned on opposite sides of said fiber.

11. The fiber waveguide of claim 9 wherein said two electrodes are deposited on said fiber.

12. The fiber waveguide of claim 9 wherein said two electrodes are located within said cladding layer.

13. The fiber waveguide of claim 8 wherein the thickness of said cladding layer is reduced in one section of said fiber.

14. The fiber waveguide of claim 8 wherein said fiber has one flat outer surface.

15. The fiber waveguide of claim 14 wherein said electric field means comprises two electrodes located on opposite sides of said flat surface with respect to the fiber axis.

16. The fiber waveguide of claim 14 wherein said fiber has a D-shaped outer cross section.

17. The fiber waveguide of claim 8 further including polarizing means optically coupled with said waveguide.

18. The fiber waveguide of claim 8 further including two polarizing means positioned in series with and on either end of said waveguide.

19. The fiber waveguide of claim 8 further including a birefringent element optically coupled with said waveguide.

20. The fiber waveguide of claim 8 further including means for independently switching the orientations of said molecular directors in one or more sections of said fiber such that said orientations are different in adjacent sections.

21. The fiber waveguide of claim 20 wherein said means for independently switching comprises more than two electrodes.

22. The fiber waveguide of claim 21 wherein said fiber has one flat outer surface and wherein said electrodes are located on said surface.

23. The fiber waveguide of claim 8 further including polarizing means within said fiber, wherein said polarizing means comprises a conductive material proximate to said liquid crystal core.

24. The fiber waveguide of claim 8 wherein said liquid crystal is a SmA* liquid crystal.

25. The fiber waveguide of claim 8 wherein said liquid crystal is a SmC* liquid crystal.

26. The fiber waveguide of claim 8 wherein said liquid crystal is a DHF liquid crystal.

27. The fiber waveguide of claim 8 wherein said liquid crystal is a nematic liquid crystal.

28. The fiber waveguide of claim 8 further including means for coupling light into said waveguide.

29. The fiber waveguide of claim 8 wherein said liquid crystal is a smectic liquid crystal with molecular directors approximately parallel to the fiber axis.

30. The fiber waveguide of claim 8 wherein said liquid crystal is a smectic liquid crystal with each molecular director in a plane approximately orthogonal to the fiber axis and wherein the smectic layers are approximately planer.

31. The fiber waveguide of claim 8 wherein said liquid crystal is a nonpolymeric liquid crystal.

32. The fiber waveguide of claim 31 wherein said liquid crystal is a smectic liquid crystal with molecular directors approximately parallel to the fiber axis.

33. The fiber waveguide of claim 31 wherein said fiber cladding layer is a glass fiber cladding layer.

34. The fiber waveguide of claim 33 wherein the diameter of said liquid crystal core is on the order of ten microns.

* * * * *

UNITED STATES PATENT AND TRADEMARK OFFICE
CERTIFICATE OF CORRECTION

PATENT NO. : 5,361,320
DATED : November 1, 1994
INVENTOR(S) : Liu et al.

It is certified that error appears in the above-identified patent and that said Letters Patent is hereby corrected as shown below:

In claim 1, column 7, line 50, insert --layer-- between "cladding" and "characterized" and delete "layer" following "axis".

Delete claim 5.

In claim 30, column 9, line 11, delete "planer" and replace with --planar--.

Signed and Sealed this

Twenty-third Day of May, 1995

Attest:

BRUCE LEHMAN

Attesting Officer     Commissioner of Patents and Trademarks